Sept. 15, 1964  E. H. LEHMANN  3,148,581
CYLINDRICAL SURFACE PROJECTION APPARATUS
Filed Jan. 30, 1961  4 Sheets-Sheet 1

INVENTOR.
ERNEST HENRY LEHMANN
BY Stanley Z. Cole
ATTORNEY

INVENTOR.
ERNEST HENRY LEHMANN
BY
*Stanley Z Cole*
ATTORNEY

INVENTOR.
ERNEST HENRY LEHMANN
BY
ATTORNEY

United States Patent Office 3,148,581
Patented Sept. 15, 1964

3,148,581
CYLINDRICAL SURFACE PROJECTION
APPARATUS
Ernest H. Lehmann, Rochester, N.Y., assignor to Xerox
Corporation, a corporation of New York
Filed Jan. 30, 1961, Ser. No. 85,819
4 Claims. (Cl. 88—24)

This invention relates to xerography and more particularly to improved apparatus for projecting an image from a cylindrical xerographic plate.

In the most widely used form of xerography an electrostatic latent image is formed by uniformly electrostatically charging a xerographic plate including a photoconductive insulating layer and then exposing the plate to an image pattern of light and shadow whereby the charge is selectively dissipated to form an electrostatic latent image. This latent image is then developed or made visible through the selective attraction thereto of electrostatically attractable powder or other material. The developed or visible image may then be viewed on the plate, transferred to another surface, or otherwise utilized. In a recent extension of the art of xerography, as more fully described in pending U.S. application, Serial No. 738,520, filed May 28, 1958, the developed image on the plate is used to form a brilliant projected image through utilization of the specular reflection properties of many types of xerographic plates. This system has been termed PROXI (Projection by Reflection of Xerographic Images).

Practical exploitation of the PROXI principle requires that it be coupled with a simple, automatic xerographic apparatus. The simplest and most widely employed form of automatic xerographic apparatus has been that which employs a xerographic plate in the form of a cylinder which is rotatable about its axis and coated on its periphery with a layer of photoconductive insulating material. Machines based on this form of plate are very simple and efficient in carrying out the conventional xerographic process, but a cylindrical surface is not the ideal surface from which to project an image. Heretofore it has been necessary either to resort to more complex forms of apparatus employing flat or other forms of xerographic plates or else to use cylindrical plates and accept the optical inefficiencies associated therewith.

It is accordingly a principal object of the present invention to provide improved xerographic apparatus embodying both a cylindrical xerographic plate and a novel projection system to produce improved projected images.

It is a further object of the present invention to provide improved optical apparatus whereby improved projection may be had from cylindrical specularly reflecting xerographic plates or other like surfaces.

This and related objects will be apparent in the following description and drawings.

Figure 1:
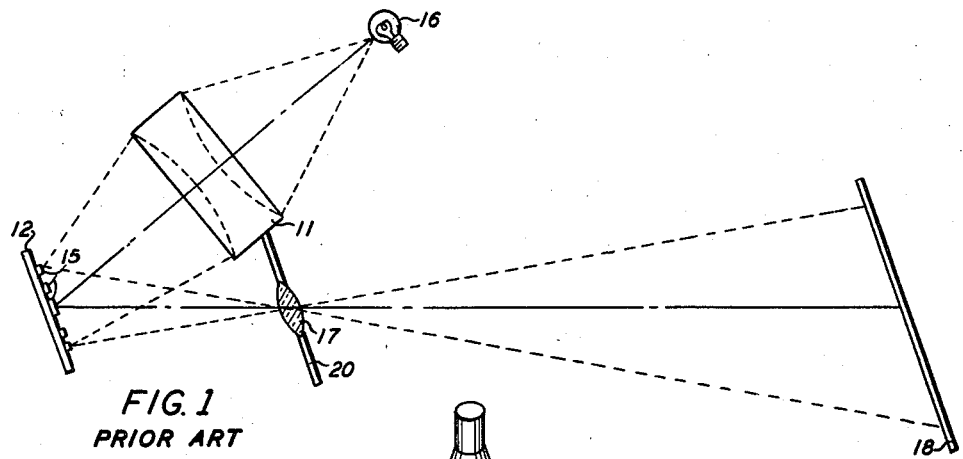
FIGURE 1 is a sectional schematic view of a PROXI projection system.

FIGURE 1 illustrates the PROXI system of xerographic image projection as it is known to the art. A specularly reflective element 12 which might, for example, comprise a selenium coated xerographic plate, carries on its surface a light diffusing image pattern 15 which may comprise a powder pattern of virtually any type of powder. A lamp 16 and condensing system 11 direct a converging beam of light at reflecting element 12 which in turn reflects this light towards a projection lens 17 which may be mounted in a light shield 20 as shown. Light passing through lens 17 is then focused onto a screen 18 which may be an opaque or translucent viewing screen or a sheet of sensitive film, a further xerographic plate, or the like. The optical relationships are such that condensing system 11 focuses an image of lamp 16 at lens 17 while lens 17 focuses reflecting portions of element 12 onto screen 18. There is thus a very efficient utilization of the light from lamp 16 and nearly all the light collected by condensing system 11 is ultimately focused onto screen 18 except for the light which is either absorbed or diffusely reflected by image pattern 15. Diffusely reflected light is not intercepted by lens 17 and is thus prevented by light shield 20 from reaching screen 18.

Figure 2:
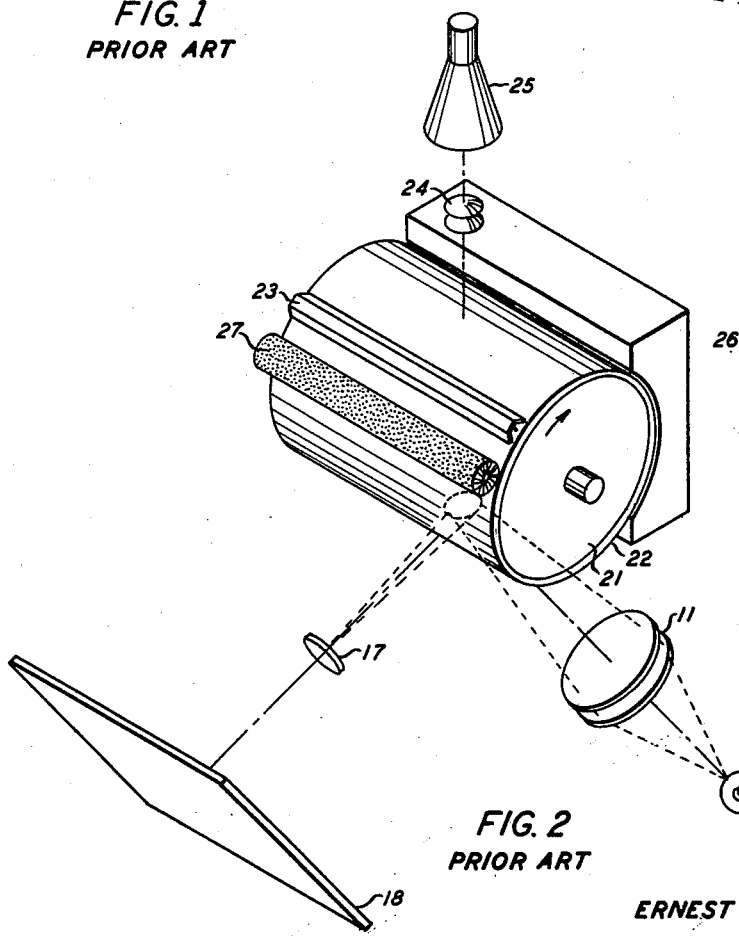
FIGURE 2 is a schematic isometric view of a form of automatic xerographic apparatus including PROXI projection.

FIGURE 2 is a schematic representation of a conventional type of automatic xerographic apparatus adapted for use with the PROXI system of projection. It includes a cylindrical xerographic plate 21 which is coated on its outer surface with a layer 22 of vitreous selenium or other specular photoconductive insulating material and which is uniformly or intermittently rotatable about its axis by drive means, not shown. A corona charging device 23 is positioned to apply an electrostatic charge to the plate. Rotation of plate 21 by motor 28 linked through arm 29 to shaft 30 of the drum in the illustrated direction carries the charged area past a lens 24 and cathode ray tube 25 which cooperate to project a light image onto the plate to form an electrostatic latent image thereon. The plate next passes a developing apparatus 26 which pours electrostatically attractable powder particles over the plate thereby forming on the plate an adherent powder pattern in image configuration. Further rotation of the plate carries the developed area into position for projection by the projection system which includes the same elements, identically numbered and substantially identically disposed, as those shown in FIGURE 1. Further rotation of the plate carries it into contact with a rotating brush 27 which removes the powder image from the plate, thus preparing it for reuse. All the xerographic elements shown in this figure are conventional, are shown for illustrative purposes only, and may be replaced with other conventional elements.

Figure 3A:
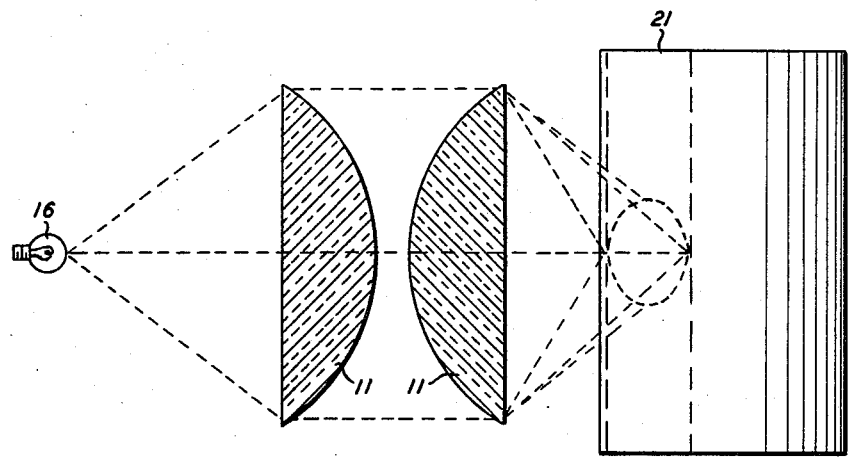
FIGURES 3A and 3B are sections taken on two perpendicular planes of the optical system of FIGURE 2.
Figure 3B:
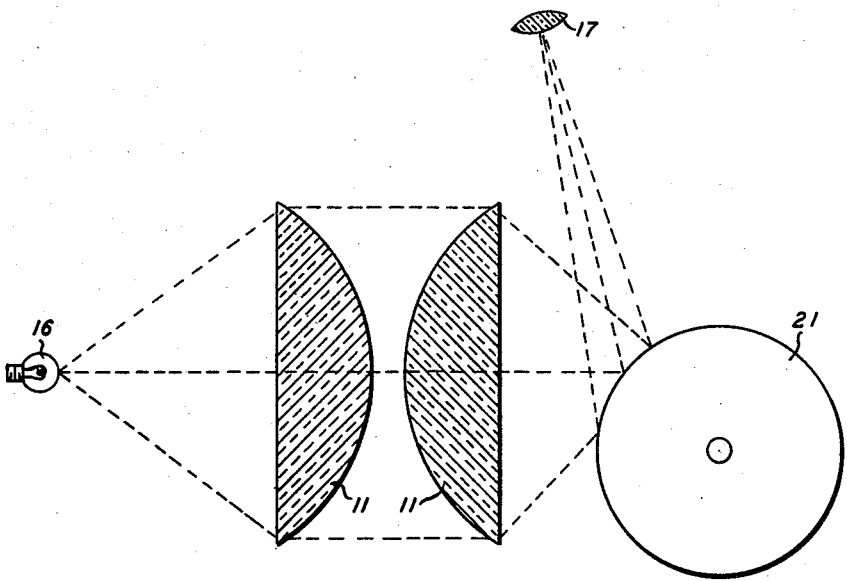

FIGURE 3A is a simplified section view of the projection system of FIGURE 2 on a plane parallel to the axis of rotation of plate 21 while FIGURE 3B is taken on a plane perpendicular to that of the plate axis. One feature which is apparent in this figure is the high degree of convergence of the light issuing from condensing system 11 which is required to compensate for the diverging effect of reflection from the convex cylindrical surface of plate 21. In this respect the projection system of FIGURES 2 and 3 differ somewhat from that of FIGURE 1 which shows projection from a flat surface. Because of this high degree of convergence the area of plate 21 illuminated by condensing system 11 is very much smaller than the condensing system itself. Thus if it is desired to project and thus to illuminate the entire length of cylindrical plate 21 it is necessary to use a condensing system which is very much larger than plate 21 itself. Since cylindrical plates in xerographic machines commonly employ plates having an axial length of 11 inches or greater it is apparent that a suitable condensing system would have to be of a completely impractical size if it were to illuminate the entire length of the cylindrical plate. If such a condensing system were actually employed it would infringe upon the space occupied by projection lens 17 and it would be necessary, if possible, to remove a part of the condensing system to accommodate the projection lens. Furthermore, such a condensing system would illuminate a much greater circumferential portion of the plate than could be used for projection and would then be very inefficient in utilizing the output of lamp 16. While it is generally desirable to project the full length of plate 21 upon a screen 18, problems associated with depth of focus and the like of projection lens 17 limit the projectionable area of plate 21 to a relatively narrow strip oriented in the longitudinal or axial direction. A suitable condensing system should illuminate this strip for its entire length with a converging beam of light but should preferably not waste light by illuminating other areas.

Figure 4A:
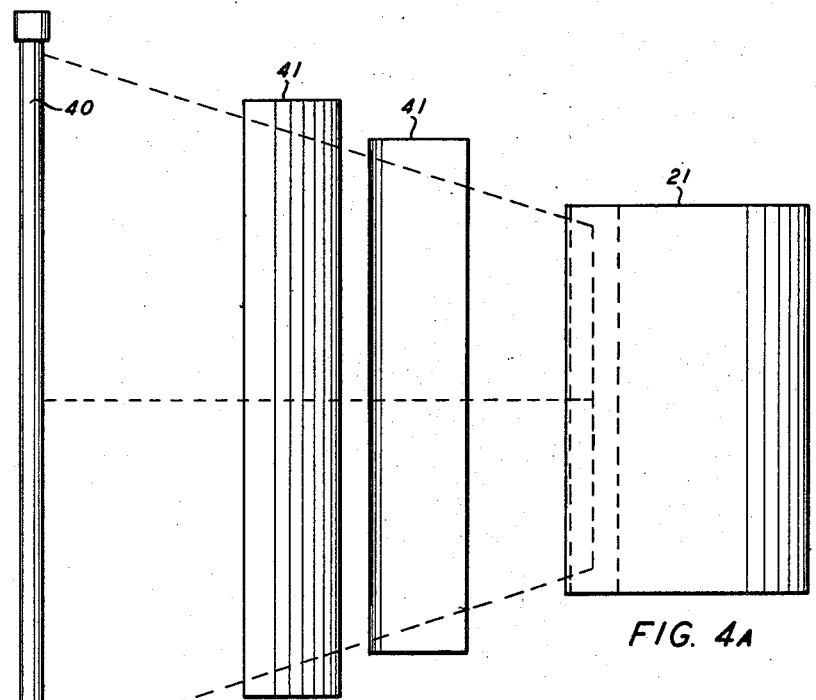
FIGURES 4A and 4B are sections taken on two perpendicular planes of an improved optical system according to the invention.
Figure 4B:
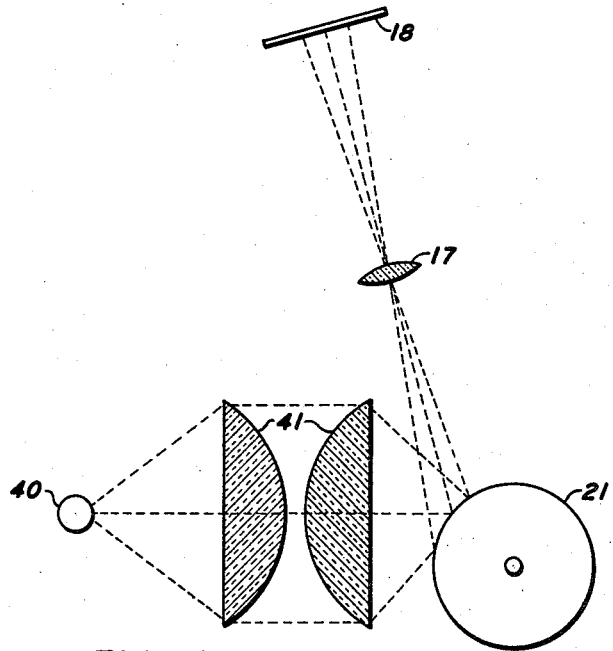

FIGURES 4A and 4B are views similar to FIGURE 3 but showing an improved form of apparatus according to the invention. It will be realized that FIGURES 4 and 5 show the condensing apparatus in an expanded form for the sake of illustrative clarity. This embodiment includes as a light source a long tubular lamp which is oriented with its axis substantially parallel to that of plate 21. Lamp 40 may be a fluorescent lamp or other type of gas discharge lamp or it may comprise a tubular type of incandescent lamp or the like. In this embodiment lamp 40 should preferably be longer than plate 21 in order to supply properly converging light in the plane of FIGURE 4A. Light from lamp 40 is intercepted by a set of cylindrical condensing lenses 41 and focused by them on plate 21. These condensing lenses are adapted to illuminate a relatively narrow band extending the length of plate 21 with a highly converging beam of light. Although lenses 41 must be longer in this embodiment than plate 21 itself they are relatively small in their width and thickness and are far less bulky than spherical lenses having a diameter equal to the length of lenses 41 and do not interfere with placement of lens 17. When coupled with an extended light source as shown they provide a very efficient utilization of the light source and focus the light where needed in a very efficient manner.

Figure 5A:
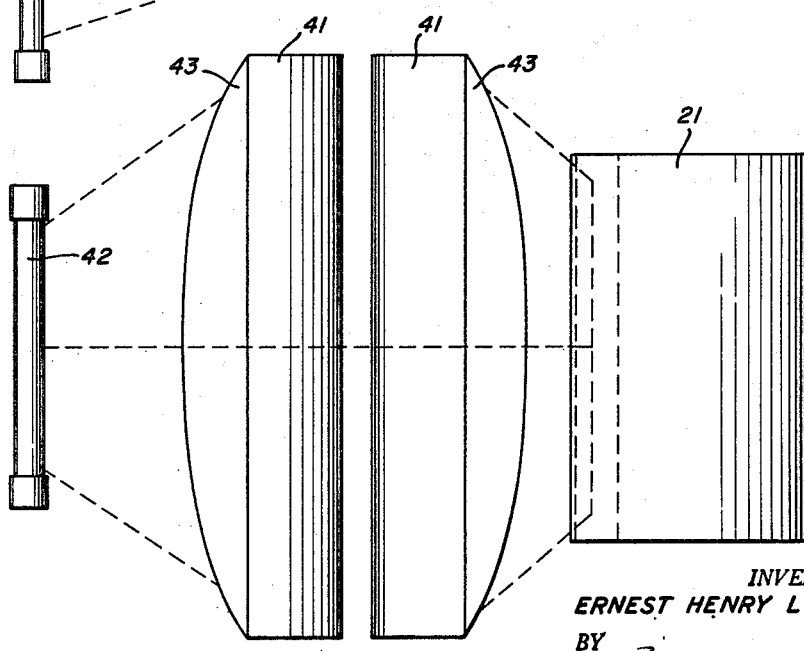
FIGURES 5A and 5B are sections taken on two perpendicular planes of a further improved form of optical system according to the invention.
Figure 5B:
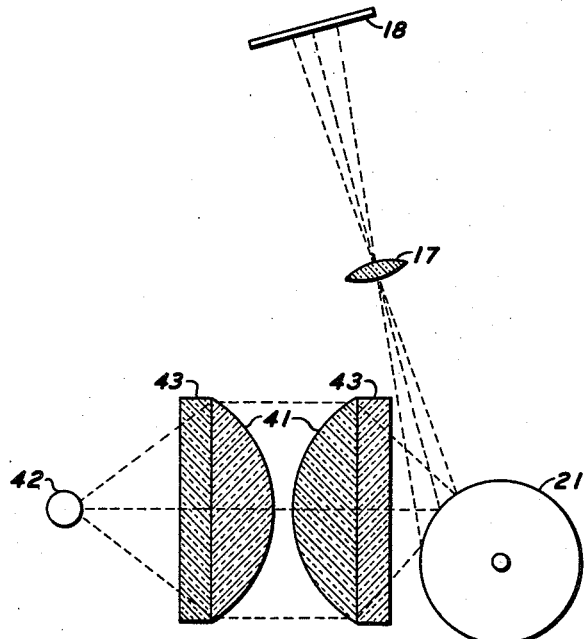

FIGURES 5A and 5B are similar to FIGURE 4 but illustrate a further improved embodiment of the invention. In accordance with this embodiment a tubular or other extended light source is also used but in distinction to the arrangement shown in FIGURE 4, this light source 42 may be relatively short rather than having to be longer than the illuminated length of plate 21. Light source 42 can also be replaced by a conventional spherical lamp or the like, with some loss in efficiency. In this embodiment the cylindrical lenses 41 are supplemented by furter cylindrical lenses 43 which have their axes perpendicular to the axis of plate 21 whereas lenses 41 have their axes parallel to that of plate 21. Both lenses 41 and 43 are characterized in being relatively long in the direction parallel to the axis of plate 21 and relatively short in the other two directions. Lenses 41 continue to perform the same function in the plane of FIGURE 5B as they perform in the plane of FIGURE 4B. However, lenses 43 provide an additional focusing action in the plane of FIGURE 5A which causes the light intercepted from lamp 42 to be directed to plate 21 in a beam which is converging in the plane of FIGURE 5A and yet illuminates the entire length of plate 21. Lenses 43 may have a longer focal length than lenses 41 since less convergence of light is generally required in the plane of FIGURE 5A than of FIGURE 5B. This is because reflection from the convex surface of plate 21 has a diverging effect in the plane of FIGURE 5B but not in the plane of FIGURE 5A.

It is well understood in the optical art that two crossed cylindrical lens systems having different powers are equivalent to a single cylindrical lens system in combination with a spherical lens system. By way of example, a crossed cylindrical lens system in which the crossed elements have powers of three diopters and two diopters is substantially equivalent to a combination of one diopter cylindrical lens in combination with a two diopter spherical lens. It is accordingly possible in the embodiment of FIGURE 5 to replace one cylindrical lens system with a spherical lens system. Normally, the weaker system, lenses 43, would be replaced by the spherical lens system and the stronger cylindrical lenses 41 would be replaced by relatively weaker or longer focal length cylindrical lenses.

When spherical lenses are used in the present invention they need not be circular in form but would be substantially identical in appearance with the lenses illustrated ni FIGURES 4 and 5 except that the curved surface of the lens would be a portion of a sphere rather than of a cylinder, i.e., it would be curved in two planes instead of one. If the power of a spherical lens is not too great its maximum thickness need not be excessive and the advantages of the arrangement of FIGURE 5 can equally well be realized with crossed cylindrical lenses or with cylindrical lenses together with spherical lenses.

There is thus provided in accordance with this invention an optical system for projecting an image from a cylindrical reflective surface, which system is simple, compact, light in weight, and inexpensive and which efficiently employs the light from a light source to project the maximum area of a cylindrical surface onto a screen or the like.

The terms "cylinder" and "cylindrical" are used throughout this specification and in the following claims and are intended to have substantially their dictionary meaning. Webster's New International Dictionary defines "cylinder" as "(a) the surface traced by one side of a rectangle rotated round the parallel side of axis, (b) the volume generated by a rectangle so rotated, (c) the surface traced by any straight line, called generatrix or element, moving parallel to a fixed straight line, (d) the space bounded by any such surface and two parallel planes cutting the elements." Chember's Technical Dictionary defines "cylindrical lens" as: "a lens cut in the shape of a cylinder, i.e., a shape generated by a straight line moving parallel to itself and tracing an arc of a circle on a normal plane." The cylindrical elements of the present invention have cross sections generally conforming to a circle or a portion of a circle but slight departures from circularity are intended to be encompassed by the term "cylindrical." It is intended that the term "cylindrical" as applied to the xerographic plate or other projectionable element include portions of circular cylinders as well as complete circular cylinders. The lenses illustrated in the drawings are generally of the plano type in that each has one curved surface and one flat surface. It will be understood that such lenses may be replaced with lenses having two opposed curved surfaces rather than one curved and one flat surface.

The particular apparatus configurations described and illustrated herein are intended for illustrative purposes only. Various modifications will occur to those skilled in the art and are intended to be encompassed within the following claims.

What is claimed is:

1. Xerographic recording and projection apparatus comprising in combination an axially rotatable cylindrical xerographic plate having a specular reflecting outer surface of photoconductive insulating material, processing means positioned adjacent to the outer surface of said plate and adapted to form an electrostatic latent image on a large surface area of said plate including a large arc in its circumference and to convert said latent image into a pattern of light diffusing powder particles, an elongated light source positioned in a plane with and in parallel axial relationship to a powder image bearing surface area of said plate, a first extended cylindrical converging lens positioned between said plate and said elongated light source with its length parallel with respect to the axis of said elongated source and said cylindrical plate and with its axis of symmetry substantially parallel to the axis of said cylindrical plate and to a line joining said cylindrical plate and said light source, a second extended converging lens positioned between said cylindrical plate and said light source with its length parallel with respect to the axis of said cylindrical plate and said elongated light source, and with its axis of symmetry parallel to the axis of said cylindrical plate a projection lens positioned to intercept the light specularly reflected by said cylindrical plate from said light source, and a screen positioned at a focal plane of said lens conjugate to that of said cylindrical plate.

2. A xerographic image forming and projection apparatus comprising a cylindrical xerographic plate having a specular reflecting outer surface, said cylindrical xerographic plate being journaled for rotation about its longitudinal axis, means to rotate said cylindrical xerographic plate about its longitudinal axis, processing means positioned adjacent the outer surface of said plate and adapted to form a latent electrostatic image on a relatively large surface area of said plate including a large arc in its circumference and to convert said latent electrostatic image into a pattern of light diffusing powder particles as said plate is rotated past said processing means, an elongated light source positioned in a plane with and in parallel axial relationship to said plate at a point in the rotational path of said plate beyond said processing means, a first extended cylindrical converging lens positioned between said plate and said light source with its length parallel to the longitudinal axis of said cylindrical plate and with its axis of symmetry parallel to the axis of said cylindrical plate and said elongated light source, a second extended converging lens positioned between said cylindrical plate and said elongated light source with its length parallel with respect to the axis of said cylindrical plate and said elongated light source and with its axis of symmetry parallel to the axis of said cylindrical plate, said converging lenses having focal lengths and being positioned so that they cause light from said light source to converge on and illuminate substantially the whole pattern of light diffusing powder particles on said electrostatic latent image, a projection lens positioned to intercept light specularly reflected by said cylindrical plate from said light source, and a viewing screen positioned at a focal plane of said projection lens conjugate to that of said cylindrical plate whereby the complete image is projected on said viewing screen.

3. Apparatus for specularly projecting a paraxially oriented large strip like surface area including a relatively large arc of a specularly reflective cylindrical member comprising, an elongated light source in a plane with and in parallel axial relationship to said surface area of said cylindrical member, a condensing system positioned between said elongated light source and said cylindrical member, said condensing system incorporating a pair of extended cylindrical converging lenses with their lengths parallel to the axis of said elongated light source and said cylindrical member and with their axes of symmetry parallel to the axis of said cylindrical member, said converging lenses having focal lengths and being positioned so that they cause light from said light source to converge on and illuminate an area substantially greater than a line on said cylindrical member, a projection lens positioned to intercept light specularly reflected by said cylindrical member from said light source, and a viewing screen positioned at a focal plane of said projection lens conjugate to that of said cylindrical member whereby said large surface area of said specularly reflective cylindrical member is projected on said viewing screen.

4. An apparatus according to claim 3 in which the reflective surface of said specularly reflective cylindrical member comprises a vitreous photoconductive insulating layer.

References Cited in the file of this patent

UNITED STATES PATENTS

| | | |
|---|---|---|
| 1,971,457 | Maurer | Aug. 28, 1934 |
| 2,005,240 | Richter | June 18, 1935 |
| 2,246,501 | Bradner et al. | June 24, 1941 |
| 2,798,966 | Summerhayes | July 9, 1957 |
| 3,056,136 | Macgriff | Sept. 25, 1962 |

FOREIGN PATENTS

| | | |
|---|---|---|
| 470,638 | Great Britain | Aug. 17, 1937 |
| 476,815 | France | June 8, 1915 |